United States Patent [19]

Taponen

[11] 3,785,415

[45] Jan. 15, 1974

[54] TREE FELLING DEVICE
[75] Inventor: Martti Taponen, Prince George, B.C., Canada
[73] Assignee: The Raymond Lee Organization Inc., New York, N.Y.
[22] Filed: June 14, 1972
[21] Appl. No.: 262,775

[52] U.S. Cl............................ 144/34 R, 144/309 AC
[51] Int. Cl.............................................. A01g 23/08
[58] Field of Search.................. 144/2 Z, 3 D, 34 R, 144/34 A–34 E, 309 AC

[56] References Cited
UNITED STATES PATENTS
3,468,352  9/1969  Larson et al. ..................... 144/34 E
3,493,020  2/1970  Choat................................ 144/34 E
3,542,100  11/1970  Choat............................... 144/34 R FOREIGN PATENTS OR APPLICATIONS
311,576  6/1969  Sweden............................ 144/34 R Primary Examiner—Gerald A. Dost
Attorney—Daniel Jay Tick

[57] ABSTRACT

A tree cutting blade is fixedly mounted in a support member. Pressure arms pivotally mounted on the support member grapple a tree and draw the cutting blade into the tree toward the pressure arms. Hydraulic means mounted on the support member and coupled to the pressure arms rotate the pressure arms to draw the cutting blade into the tree toward the pressure arms.

3 Claims, 4 Drawing Figures

3,785,415

PATENTED JAN 15 1974

TREE FELLING DEVICE

DESCRIPTION OF THE INVENTION

The present invention relates to a tree felling device.

The principal object of the invention is to provide a tree felling device of simple structure which utilizes a thin cutting blade to prevent splitting of the butt of the tree.

An object of the invention is to provide a tree felling device of light weight which functions with efficiency, effectiveness and reliability.

Another object of the invention is to provide a tree felling device which may be utilized to grapple and pick up felled trees.

Still another object of the invention is to provide a tree felling device which may fell a tree on either the uphill side or the downhill side of a hillside road.

In order that the invention may be readily carried into effect, it will now be described with reference to the accompanying drawing, wherein.

In the FIGS., the same components are identified by the same reference numerals.

Figure 1:
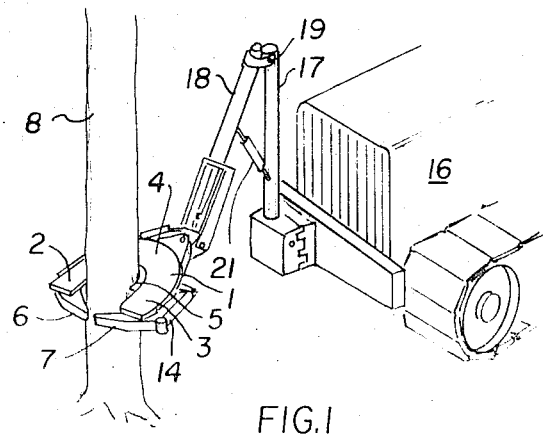
FIG. 1 is a perspective view of an embodiment of the tree felling device of the invention in operation.
Figure 3:
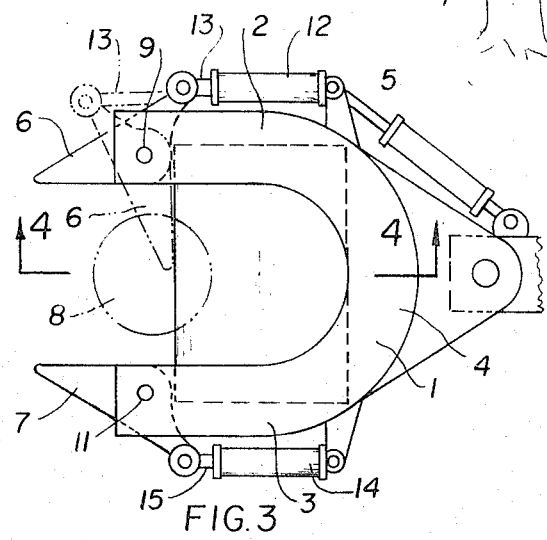
FIG. 3 is a top view, taken along the lines 3—3, of FIG. 2.
Figure 4:
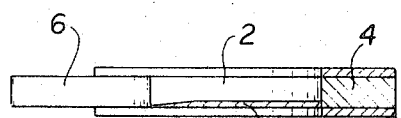
FIG. 4 is a view, partly in section, taken along the lines 4—4, of FIG. 3.
Figure 2:
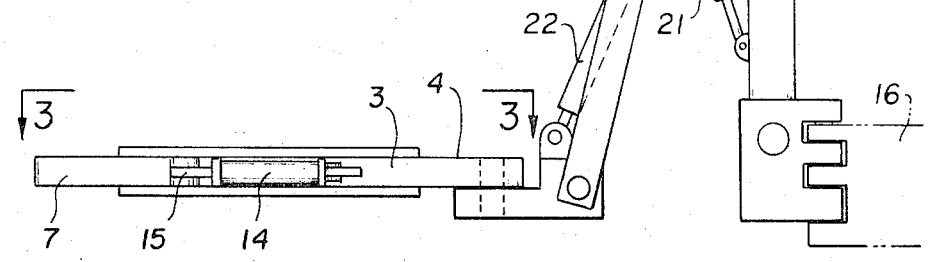
FIG. 2 is a side view of the embodiment of FIG. 1 of the tree felling device of the invention.

The tree felling device of the invention comprises a support member 1 (FIGS. 1, 2, 3 and 4) of substantially U-shaped configuration having a pair of spaced substantially parallel legs 2 and 3 joined at a corresponding end of each by a head 4 (FIGS. 1 and 3).

A tree cutting blade 5 is fixedly supported in the support member 1 by the legs 2 and 3 and head 4 thereof.

A pair of pressure arms 6 and 7 are pivotally mounted on the support member 1 (FIGS. 1 and 3) for grappling a tree 8 (FIG. 1) and drawing the blade 5 into said tree toward said pressure arms. The pressure arm 6 is mounted at the free end of the leg 2 via a pivot pin 9 (FIG. 3). The pressure arm 7 is mounted at the free end of the leg 3 via a pivot pin 11 (FIG. 3). The pressure arms 6 and 7 rotate toward and away from each other and the cutting blade 5, as shown in FIG. 3.

A hydraulic cylinder 12 is mounted on the support member 1 and coupled to the pressure arm 6 via a coupling pin 13 (FIG. 3) and rotates said pressure arm to draw the cutting blade 5 into the tree 8 toward said pressure arm. A hydraulic cylinder 14 is mounted on the support member 1 and coupled to the pressure arm 7 via a coupling pin 15 (FIG. 3) and rotates said pressure arm to draw the cutting blade 5 into the tree 8 toward said pressure arm.

The tree felling device of the invention may be mounted by any suitable means on any suitable means for use. Thus, for example, the tree felling device may be mounted on a tractor or truck 16 (FIGS. 1 and 2) via a substantially vertical post 17, a support post 18 pivotally mounted at one end on the post 17 via a pivot pin 19 and affixed at the other end to the support member 1. The support post 18 is hydraulically movable at desired angles to the post 17 via a hydraulic cylinder 21 and is hydraulically movable up and down via a hydraulic cylinder 22.

While the invention has been described by means of specific examples and in specific embodiments, I do not wish to be limited thereto, for obvious modifications will occur to those skilled in the art without departing from the spirit and scope of the invention.

I claim:

1. A tree felling device, comprising
   a support member;
   a single tree cutting blade fixedly mounted in the support member;
   pressure arm means pivotally mounted on the support member for grappling a tree and drawing the cutting blade into the tree toward said pressure arm means, the pressure arm means comprising a pair of pressure arms mounted in spaced relation and adapted to rotate toward and away from each other and the cutting blade; and
   hydraulic means mounted on the support member and coupled to the pressure arm means for rotating said pressure arm means to draw the cutting blade into the tree toward said pressure arm means.

2. A tree felling device as claimed in claim 1, wherein the hydraulic means comprises a pair of hydraulic cylinders each coupled to a corresponding one of the pressure arms.

3. A tree felling device as claimed in claim 2, wherein the support member is of substantially U-shaped configuration having a pair of spaced substantially parallel legs joined at a corresponding end of each by a head, the cutting blade is supported by the legs and head of the support member, and each of the pressure arms is mounted at the free end of a corresponding one of the legs.

* * * * *